United States Patent [19]
Winter et al.

[11] Patent Number: 5,207,912
[45] Date of Patent: May 4, 1993

[54] PROCESS FOR TREATING OILY SLUDGE

[75] Inventors: John D. Winter, Port Neches; James E. Myers, Port Arthur; William R. Deever, Beaumont, all of Tex.

[73] Assignee: Texaco Inc., White Plains, N.Y.

[21] Appl. No.: 868,072

[22] Filed: Apr. 13, 1992

[51] Int. Cl.$^5$ .............................. C02F 3/02
[52] U.S. Cl. ...................... 210/604; 210/610; 210/612; 210/618; 210/620
[58] Field of Search ............ 210/150, 151, 616, 617, 210/618, 620, 610, 612, 603, 604, 631

[56] References Cited

U.S. PATENT DOCUMENTS

| | | | |
|---|---|---|---|
| 3,462,275 | 8/1969 | Bellamy | 210/612 |
| 3,779,906 | 12/1973 | Levin | 210/616 |
| 3,933,629 | 1/1976 | Smith | 210/618 |
| 4,062,770 | 12/1977 | Kneer | 210/620 |
| 4,192,742 | 3/1980 | Bernard et al. | 210/617 |
| 4,292,328 | 9/1981 | Coultbard et al. | 426/2 |
| 4,623,464 | 11/1986 | Ying et al. | 210/616 |
| 4,668,388 | 5/1987 | Dibble et al. | 210/612 |
| 4,882,058 | 11/1989 | Burton | 210/617 |
| 5,078,881 | 1/1992 | Augustine et al. | 210/618 |

Primary Examiner—Stanley S. Silverman
Assistant Examiner—Christopher Upton
Attorney, Agent, or Firm—Robert B. Burns; James J. O'Loughlin

[57] ABSTRACT

A method for aerobically treating a low solids water-containing oily sludge which comprises combining said sludge with a biologically inert, non-friable bulking agent characterized by having a substantial component with a density less than water to form a mixture, passing an oxygen-containing gas through said mixture to separate excess water and form a high solids content reaction mixture, reacting said high solids content reaction mixture in the presence of an aerobic biomass under effective aerobic conditions to form a treated sludge and an active biomass-coated bulking agent component having a density less than water in said high solids content reaction mixture, separating said biomass-coated bulking agent component from said treated sludge, and recovering said treated sludge from said reaction mixture has been provided.

35 Claims, 1 Drawing Sheet

PROCESS FOR TREATING OILY SLUDGE

BACKGROUND OF THE INVENTION

1. Field of the Invention

This invention relates to a process for aerobically biodegrading oily sludges.

2. Description of the Prior Art

Historically, land farming has been widely used for the biodegradation and disposal of organic wastes and oily sludges. Land farming involves applying the waste to soil and tilling the waste into the soil to allow aerobic bacteria to convert the organic components into carbon dioxide, water and humic matter. Periodic tilling of the soil is necessary to mix the waste uniformly into the soil and to allow air to reach the bacteria and promote the reaction. The availability of the land farming technique has been sharply reduced as a result of regulations relating to the land disposal restriction for hazardous wastes and the environmental impact of the process. In particular, odor generation, the deposition of heavy metals in the soil, and the potential contamination of ground water supplies have resulted in a major reduction in the use of land farming for treating organic and oily wastes.

In many places, composting has taken the place of land farming. Composting is a thermophilic biological process that is widely used for the treatment of municipal sludge and other organic wastes. An important aspect of composting is that the process can be conducted under controlled conditions, thus avoiding the problems inherent in open land farming. A significant use of composting relates to the treatment of municipal sludge. This process is often done by mixing the municipal sludge with a bulking agent, removing excess free water, and subjecting the mixture to forced aeration at an elevated temperature to speed up the composting process. In general, municipal sludge, as well as other types of organic waste, together contain both active microorganisms and nutrients which can initiate and maintain the biological conversion process under suitable conditions.

Oily sludge is extensively found in oil refineries and is also generated in a range of manufacturing operations. In refineries, the oily sludge is produced in a variety of clarifier processes, in holding tanks, and in settling ponds for liquid waste. In general, oily sludge is characterized as relatively low in solids content and which exhibits little biological activity. This latter property is primarily due to the deficient nutrient and electron acceptor contents of the oily sludge.

DISCLOSURE STATEMENT

U.S. Pat. No. 4,292,328 discloses a thermophilic aerobic digestion process for producing animal nutrients by the biochemical degradation of animal waste matter.

U.S. Pat. No. 4,668,388 discloses a high rate reactor for the treatment of biosludge, wherein the reaction is conducted in an enclosure which minimizes any adverse environmental impact. The mixing of sludge with a bulking agent and the use of forced aeration using air pressure as well as process controls are disclosed. This reference reports that no decomposition rate advantage was found when oily sludges were treated in this high rate sludge reactor.

U.S. Pat. No. 3,462,275 discloses a process for treating biodegradable organic waste material using a thermophilic aerobic microorganism culture capable of digesting cellulose and produce cellular proteinaceous material.

The disclosures in U.S. Pat. Nos. 3,462,275; 4,292,328 and 4,668,388 are incorporated herein by reference.

An object of this invention is to provide a novel process for remediating oily sludge.

Another object is to provide a more improved method for treating low solids content oily sludge.

Still another object is to provide a process which generates and maintains an active biomass substrate for extended periods of time.

Another object is to provide a process for the bioremediation of a low solids content oily sludge in a high solids content reaction.

Another object is to provide a method for treating oily sludge solids in deep beds of the reaction mixture with reduced mixing energy requirements.

Another object is to provide a method for dewatering and treating sludges in the same reaction vessel.

DETAILED DESCRIPTION OF THE DRAWING

Figure 1:
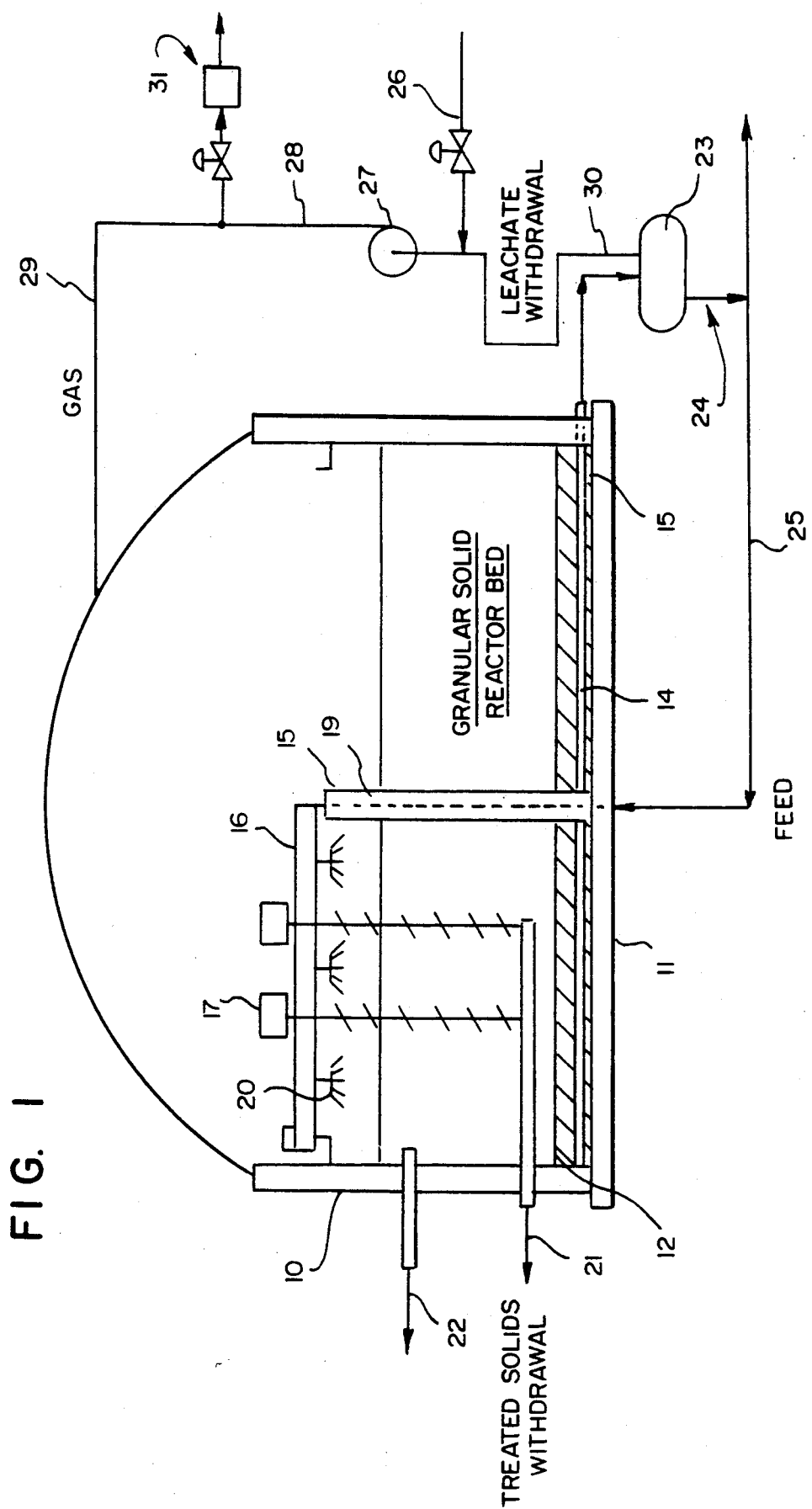
FIG. 1 is a schematic cross-section view showing a typical arrangement for a reaction vessel useful for conducting the practice of the invention.

FIG. 1 is a cross-section view showing a typical arrangement of a reactor vessel and bed. The reactor 10 is an enclosed vessel with an external base 11 and an oil-resistant vapor and liquid permeable internal membrane/separator 12 spaced apart from said base. The membrane/separator is a barrier to the passage of the bulking agent and the sludge solids, but freely passes water, leachate and gases from the reaction mixture into collection zone 14 between the membrane/separator and the base 11 Central post 15 carries a cross-arm 16 on which is mounted mechanical mixing means 17 and spray heads 20 for introducing oily sludge and may also be used for feeding make-up water or recycled oxygen-containing gas. Brackets 18 are bearing supports for the outer end of supporting arm 16, enabling the control arm to traverse the reaction mixture in a circular manner. Conduit 19 passes through central post 15 and communicates with the spray heads 20 mounted on cross-arm 16. Conduit 19 and spray heads 20 may communicate with a feed supply for the oily sludge, not shown. Other means may be employed for introducing the feed charge. Conduit 21 communicates with the treated solids in the reaction bed and is an unloading route for the withdrawal of treated solids.

Line 15 communicates with the fluids and gases in collection zone 14 and carries the water, leachate and gases to the collection tank 23. Collection zone 14 may be an open space or it may be filled with packing material so long as an adequate passageway remains open for the removal of water and gases. Line 24 communicates with line 25 for the withdrawal of liquids from tank 23, either for disposal or for recycling to the reactor via lines 25 and 19.

Line 26 is for an oxygen-containing gas supply for the process which may be delivered through pump 27 and lines 28 and 29. A heater, not shown, is optionally installed on the gas inlet line. Line 30 communicates with lines 28 and 29 for the recycle of oxygen-containing gas from collection tank 23 to the reactor. Line 30 may also be used for the removal of offgases from tank 23 through line 28 and exit line 31.

The reactor bed contains a nearly biologically inert, oil-resistant, non-friable bulking agent, some part of which has a specific gravity less than water. The bed height may range from about 3 feet deep to about 20 feet deep. Sensors, not shown, are attached to the reactor to monitor temperatures. The oxygen content and the pH of the reaction mixture are measured in the fluids leaving the reactor in order to maintain optimum reaction conditions. Line 21 communicates with the reaction zone in the bed of the reaction mixture for the withdrawal of treated solids. Line 22 communicates with an upper portion of the reaction zone. It may be used to remove the active biomass-coated bulking agent from the reaction zone after it has been separated from the treated oily sludge solids. This biomass-coated bulking agent is particularly valuable for treating fresh oily sludge solids without a prolonged incubation period.

SUMMARY OF THE INVENTION

The present invention is a novel method for aerobically treating water-containing oily sludges having a relatively low solids content in a high solids content reaction. This process may be conducted in a closed reactor with suitable controls to prevent any adverse environmental impact. The process involves mixing the oily sludge with an inert and non-friable bulking agent with a substantial component having a density less than water in the presence of active biomass and nutrients. An oxygen-containing gas is passed through the reaction mixture to assist in the removal of excess (free) water from the sludge to form a wetted high solids content reaction mixture containing the oily sludge and oily sludge solids in a bed of bulking agent. Effective aerobic reaction conditions are employed to convert the oily sludge to a treated sludge and to coat the bulking agent, including the bulking agent component having a density less than water, and sludge solids with active biomass media. The biomass-coated bulking agent low density component is then separated from the treated oil sludge solids. The treated oily sludge is recovered and the active biomass-coated bulking agent component having a density less than water is used for the treatment of fresh oily sludge.

DESCRIPTION OF THE PREFERRED EMBODIMENTS

The present invention is particularly adapted to the remediation or treatment of a low solids content water-containing oily sludge from a variety of manufacturing operations, but, more particularly, from oil refinery operations. The low solids content oily sludge may have anywhere from about 1 to about 30 weight percent of solids in the sludge, although occasionally a larger amount may be present. Often, such a sludge will have from about 1 to about 10 percent of solids, and most often from about 2 to 7 weight percent solids. Oily sludge is lacking in many nutrient materials which are vital for microbial activity. The oily sludge may also contain some treatable organic liquids. A valuable aspect of this process is that the organic liquids and solids present or mixed in the oily sludge tend to adhere to the solid components in the high solids content reaction mixture and be remediated in the course of this biodegradation process. Oily sludges from some operations may be classified as a toxic or hazardous waste material.

The low solids content water-containing oily sludge is mixed with a suitable amount of a biologically inert, non-friable bulking agent characterized by having a substantial component with a density less than water, and solid residue from the ongoing treatment of the oily sludge, to form a reaction mixture. The nature and properties of the bulking agent are critical in the present invention. The bulking agent may be prepared from a synthetic material, such as polystyrene or polypropylene, or it may be prepared from natural materials having the prescribed properties. It must be substantially inert, that is, it must not be a carbon source or be consumed to a significant extent by the microorganisms in aerobic biodegradation processes. Preferably, the bulking agent should be essentially non-reactive with aerobic microorganisms. The bulking agent must also be substantially oil-resistant and substantially insoluble in the liquid components employed in the reaction, either the water or organic solvents introduced with the sludge. The texture of the surface of the bulking agent may be irregular, smooth, or porous.

A vital property of the bulking agent is that a substantial component or fraction of the bulking agent must have a particle density less than the density of water. This characteristic of the light bulking agent component is employed to promote an effective separation of the light bulking agent component from the treated oily sludge. The density of the light bulking agent component having a density less than the density of water is determined in the dried form and is expressed in pounds per cubic foot of the dry material. In general, the bulk density of the light component may range from about 0.5 to 15 pounds per cubic foot. A more preferred bulk density for this component is from about 1 to 10 pounds per cubic foot, with the most preferred range being from about 1 to 4 pounds per cubic foot. The light bulking agent component may be prepared from synthetic materials or plastics and may be prepared by a process that produces closed cell foam plastic beads, such as polystyrene beads.

Ideally, the bulking agent may consist of a single material having a substantial component or fraction that has a density lighter than water, and a second component or fraction that is heavier than water. A suitable mixture of the two components or fractions, when employed in the dewatered high solids content reaction mixture, will produce effective operating densities for this reaction mixture of broadly from 10 to 80 pounds per cubic foot, and, most preferably, from about 30 to 60 pounds per cubic foot. Since the synthetic or plastic materials are generally very light, as noted above, it is contemplated that a portion of the same material may be made heavier than water by the encapsulation of a heavy inert material within the synthetically prepared bulking agent. The heavy inert filler material may be clay, titanium dioxide, sand, and any other heavy inert material. Alternatively, more than one bulking agent may be employed, with at least one bulking agent being a component having a density less than water and at least one bulking agent being a component having a density heavier than water. The ratio of light bulking agent component to the heavy bulking agent component may range from about 25 percent to 75 percent by volume. A preferred ratio is about a 50—50 volume ratio.

The bulking agent reactor media is typically a multicomponent mixture consisting of one or more inert components and the treated solids. At least one component of the bulking agent/media as noted above must have a particle specific gravity of less than 1.0 (less than water). This is necessary to promote the separation of an active biomass-coated bulking agent component having a density less than water to enable the recovery and reuse or recycling of an active biomass-coated component acclimated to the waste feed.

The average operating density of the high solids content reaction mixture (wet, but without free water and containing particles covered with a biofilm) should be between 10 and 80 pounds per cubic foot, preferably from 20 to 75, and most preferably from 30 to 60 pounds per cubic foot. Materials with a density less than 10 pounds per cubic foot will not mix properly, and materials with a density substantially above 80 pounds per cubic foot, say 100 pounds per cubic foot, make mixing difficult and inefficient because of the high density. A high density mixture also requires substantially additional energy input for effective mixing.

It has been found that a mixture of plastic foam beads and sand has ideal mixing characteristics, but a single component system of solid plastic beads or a denser plastic foam bead possibly with an inert filler, such as clay, $TiO_2$, or sand, would also be effective. It should be noted that the oily sludge being treated will generally always introduce some clay and/or sand into the reactor.

Because an optimum density for the bulking agent is relatively easy to achieve, another benefit is realized. The high solids content reaction mixture comprising the bulking agent and the oily sludge solids may be mixed with a modest energy input. As a result, deep beds of the reaction mixture can be processed using the present method. The depth of the high solids content reaction mixture may range from about 3 feet up to potentially 20 feet. A preferred depth is from about 3 to 15 feet deep, with the most preferred mixed depth being from about 4 to 10 feet. An attractive benefit is the processing efficiency realized by being able to treat a relatively large amount of material in a deep bed reactor and to do so with a modest energy input. It is postulated that the exclusive use of a heavy bulking agent, such as sand, in a high solids deep bed reaction would require substantially greater amounts of power for mixing and that achieving an efficient aerobic reaction in a heavy compact mass of material would be difficult. It will be appreciated that effective mixing is critical to distribute feed and nutrients throughout the reaction mixture.

The bulking agent must also be substantially non-friable, that is, it should be substantially resistant to disintegration or crumbling in the process. This is important from two aspects: (1) to maintain the bulking agent in a useful condition for extended periods of reaction time whether the process is conducted continuously or in a batch method of operation; and (2) to prevent the bulking agent from either plugging up or passing through the porous membrane/separator barrier which has the function of permitting the exit of excess water and gases from the reaction mixture. The performance advantages described above for the prescribed bulking agent are not found in conventional processes. Known bulking agents will not support the kind of separation which is a unique feature of the instant process. Also, some known bulking agents will react with or be reacted on by the biomass, tending to significantly reduce the effectiveness of the conversion of the oily sludge solids.

The physical size of the bulking agent is an important factor for an efficient operation. In general, the bulking agent may be a granular material and have a size ranging from about 0.2 to about 25 millimeters, with a preferred size ranging from about 1 to 10 millimeters, and a still more preferred size being from 1 to 5 millimeters. The actual shape of the bulking agent is not particularly important, although an aspect ratio near unity (and increasing sphericity) is generally desirable.

A large surface area in the bulking agent or substrate provides substantial advantages in the effectiveness of this process. The large surface area attracts and holds the decomposable components in the oily sludge; namely, the biomass, as well as the moisture, oxygen, and nutrients in intimate contact with the result that the bacterial oxidation of the solids being treated under appropriate aerobic conversion conditions is efficiently conducted. The retention of the biomass on the bulking agent permits a relatively high feed rate for the oily sludge to the reactor with little or no washout of the biomass, thus maintaining the high activity in the reactor and reducing the biomass separation and recycle rates necessary in most steady state bioreactors. Bulking agents may be made from synthetic materials. Expanded synthetic material, such as expanded polystyrene spheres, are extremely light weight and have a large surface area per unit mass. The surfaces of the light weight synthetic bulking agents may be irregular and may be porous, which increases their surface area for improved effectiveness in this process.

While the use of the above-described bulking agent is critical in the present process, this does not preclude the presence of other bulking agents. Conventional bulking agents that may be employed with the prescribed light bulking agent include sand and fine gravel.

There is an unmixed region between the mixed reaction media and the separation membrane. A relatively small amount of a heavy granular or comminuted material may be employed to function as a bottom filter or screen above a membrane/separator to catch any loose oily sludge solids or biomass.

The present process is conducted by directing a low solids content water-containing oily sludge into a suitable reaction vessel containing an inert, non-friable bulking agent having the prescribed characteristics. The two materials are intimately admixed with the aid of suitable mixing means. A mechanical mixing device comprising an overhead rotating arm carrying rotating augers extended into the reaction mixture has been found to be very effective. Gaseous jet streams and/or liquid jet streams or other mechanical means are also contemplated as alternative ways for agitating the reaction mixture of the bulking agent and oily sludge. This process is not dependent on any particular means for mixing the reaction mixture.

This process is conducted in a suitable reaction vessel. Preferably, it is conducted in an enclosed reaction vessel. Conducting the process in an isolated or sealed reaction vessel permits tight control of all the products and by-products of the reaction so as to avoid any adverse environmental impact from the process. However, it is contemplated that the reaction may be conducted in a reaction vessel that is not totally enclosed where environmental standards are not as stringent. At the start of the process, the nature of the water-containing oily sludge dictates whether or not other elements may be required to produce an effective aerobic reaction. If the sludge is deficient or devoid of active biomass as, for instance, when the process is initially started, it may be necessary to add an active aerobic biomass to start the reaction. Aerobic-acting bacteria that may be employed include mesophilic, thermophilic, and psychrophilic bacteria. The reactor media is biomass-covered solids, including the bulking agent and solids from the oily sludge. If the bulking agent has been previously used in a bioreaction and is coated with an active biomass already acclimated to the waste feed, which is a particularly advantageous feature of this process, it may not be necessary to add any other aerobic acting media to the reaction mixture. In the event there is a need for the injection of active biomass, it may be added directly to the water-containing oily sludge as it enters into the reaction vessel or it may be added to the high solids content reaction mixture in that stage of the process.

The aerobic bacterial reaction is dependent on the presence of suitable nutrients in the reaction mixture. In general, oily sludges tend to be deficient in many nutrients necessary to support an aerobic bacterial reaction. Suitable amounts of the required known nutrients may be added either to the low solids content water-containing oily sludge or they may be added to the high solids content reaction mixture.

This process is advantageously conducted in a reactor having a membrane/separator in the lower portion of the reactor but spaced apart from the bottom of the reactor leaving a liquid and gaseous collection zone beneath the membrane/separator support or carrier for the reaction mixture. In practice, it is convenient to first load the reaction vessel with an appropriate amount of the bulking agent. A suitable amount of the low solids content water-containing oily sludge is then added to the reaction mixture. If necessary, a small amount of an active aerobic bacteria or biomass agent and nutrients may be added to the reactor. This mixture is mixed, preferably with some or all of the reactor being mixed at all times, while a pressure differential is impressed on the reaction mixture to promote rapid dewatering of the low solids content oily sludge. A preferred method of doing this is to apply a vacuum to the collection zone below the membrane/separator in the reactor. In a closed reactor, pressure may be applied above the surface of the reaction mixture to assist in the dewatering step. This may be done in combination with the application of a vacuum below the reaction mixture. A pressure drop of from 0.2 to 10 centimeters of water has been employed in some tests, but it is contemplated that the pressure differential may range from about 0.1 to 15 inches of mercury, depending on the depth of reactor materials, the waste degradation rate, and the media particle size. The pressure differential on the reaction mixture has the effect of rapidly removing a substantial amount of the excess water content present in the low solids content oily sludge feed, but does not completely dry the reaction mixture. This leads to the formation of a high solids content reaction mixture comprising the bulking agent, sludge solids, non-aqueous liquids, and water, which is a most efficacious form for biodegrading the organic solids or other organic material in the oily sludge.

The low solids content water-containing oily sludge feed to the reactor may have from about 1 to 30 weight percent solids, with the balance being substantially oil and water. In general, the oily sludge feed will have more than 30 volume percent water and may have a water content ranging from above 30 up to about 99 volume percent. More common are oily sludge feed streams with from about 75 to 98 volume percent water. Following the dewatering step in the process, the high solids content reaction mixture will be characterized as having from about 40 to 80 volume percent solids comprising mainly bulking agent and oily sludge solids. It will be noted that the wetted biomass is not totally submerged in water in the high solids content reaction mixture as would be the case in a slurry type reaction or a submerged fixed film reactor. There is, however, sufficient water or moisture in this high solids reaction mixture to insure that the oxygen-containing gas will have a very high relative humidity, thereby promoting efficient biodegradation. It will be noted that in the cases of a slurry-type reaction or a submerged fixed film reaction, two mass transfer steps are necessary for the oxygen to pass from the air to the water and then to the biomass. In the present process, oxygen can pass directly into the biomass, a single mass transfer step.

The high solids content reaction mixture is preferably maintained under constant agitation by any suitable means while an oxygen-containing gas is introduced into the reactor to support the aerobic conversion of the oily sludge. Heat is generated by the biological reaction, and the temperature of the reaction mixture in the reactor is constantly monitored so as to maintain a most effective aerobic reaction. Generally, the temperature will be maintained between about 70° F. to about 180° F., with the preferred reaction temperature being about 90° F. to 160° F. In a preferred operation, the withdrawal of liquids and oxygen-containing gas downwardly from the reaction mixture mass and into the collection zone below the reaction mixture permeable divider may cause some loss of heat in the high solids content reaction mixture. Any heat loss may be compensated for by heating the incoming oxygen-containing gas being fed to the reaction vessel. Other means of heating the reaction mixture, say by lining the walls of the reactor with heat exchange means or by installing radiant heaters in the reactor, will be obvious to those skilled in the art. The method employed for maintaining a suitable temperature for the aerobic reaction in the reaction mixture is not a critical feature in this process.

An oxygen-containing gas is employed in the instant process to support an aerobic microbial conversion of the organic components in the oily sludge. This oxygen-containing gas, which passes through the reaction mixture, must contain sufficient oxygen to insure aerobic reaction conditions. An adequate amount of air is generally sufficient to accomplish this. However, oxygen-containing gases containing from as low as about 10 volume percent oxygen up to enriched gases containing as high as 50 volume percent of oxygen may be employed for this purpose. A preferred oxygen content for the oxygen-containing gas is from about 14 to 30 volume percent oxygen. Air with about 20 percent oxygen is a preferred source of the oxygen.

An air flow rate through the reaction mixture of from about 0.05 to 0.2 cubic feet of air per minute per square foot of the high solids content reaction mixture has been found to be effective. Broader limits are also deemed to be effective.

A suitable pH must be maintained in the reaction mixture in order to have an effective aerobic reaction. Broadly, a pH ranging from about 5.5 to 9 may be employed. A preferred range is a pH from 6 to 9, and a most preferred pH is a range from 6 to 8. The management of the pH for this microbial process is within the skill of the art.

In the course of the reaction, the oily sludge solids are aerobically reacted and converted to form a treated sludge having a reduced volume or mass and is suitable for disposal. During the course of the reaction, active biomass attaches itself to and is retained on the inert bulking agent components. When the oily sludge solids have been sufficiently converted to form a treated sludge, this treated sludge is separated from the light bulking agent now retaining substantial amounts of the active biomass. This separation may be accomplished by pumping water into the reaction vessel. The light bulking agent component, having a density lower than water and carrying retained or attached biomass, will separate by flotation from the treated oily sludge solids. In the separation, an upper layer will form comprising the light bulking agent component with retained biomass, and a lower layer comprising the treated oily sludge solids with any heavier bulking agent.

In the separation, a substantial amount of the low density component of the bulking agent is separated by flotation from the body of the treated sludge solids. Generally, above 50 percent of the low density component of the media-coated bulking agent will separate in the flotation step. It is preferred that at least 65 percent of the low density component of the bulking agent be so separated with a more preferred amount being at least 80 percent. Still more preferred is to separate at least 90 percent of the low density component of the bulking agent, and most preferably to separate for recovery and reuse at least 95 percent of the used and media-coated low density component of the bulking agent.

It will be appreciated that the separation and recovery of the low density or light bulking agent component represents not only a significant economic savings in the operation of the process, but also substantially reduces the amount of treated solids that have to be recovered and disposed. It has been noted above that the availability of the bulking agent with attached acclimated active biomass substantially enhances the treatment of fresh oily sludge charge.

The treated sludge may be removed from the reactor and the active media-coated light bulking agent retained in the reactor for the processing of a fresh charge of low solids content water-containing oily sludge. Alternatively, the reaction mass can be removed from the reactor first, followed by separation of the treated sludge from active media-coated bulking agent, followed by recycle of the media-coated bulking agent to the reactor for further reaction with fresh oily sludge. Because the biomass media retained on the bulking agent is in an active or viable state or condition and acclimated to the waste sludge feed, no extended incubation period is required for the continuance of this process.

EXAMPLE

An enclosed cylindrical reactor vessel having an internal separator consisting of non-woven geotextile with a layer of fine sand on the geotextile and having an integral drainage zone below said geotextile separator filled with pea-size gravel and having a perforated pipe conduit into said drainage zone was employed. Reactor media, comprising a biomass and a bulking agent consisting of a 50—50 volume percent of plastic beads having from 1 to 5 millimeters diameter and a dry bulk density from 1 to 4 pounds per cubic foot, and sand, having from 0.01 to 1 millimeters diameter, is introduced into the reactor.

One hundred parts of oily sludge with added nutrients having a solids content of about 5 weight percent are introduced into the reactor. A vacuum of about 1 psi per foot of reaction mass depth is applied to the drainage zone while heated air is introduced into the top of the reactor and while the oil sludge and reactor media are thoroughly mixed with continuous or intermittent agitation.

The reaction temperature is maintained between 70° F. and 140° F. and a gas flow rate for air is about 0.1 foot per minute downwardly through the reaction mixture.

A dewatering rate is achieved that far exceeds the maximum feed rates based on the biodegradation rates. It is calculated that biosludge treatment rates exceeding one pound of dry solids per square foot per week, or oily sludge treatment rates exceeding 10 pounds of sludge per square foot per week will be realized.

A novel method for the treatment of oily sludge has been provided. This process provides unique advantages in efficiency for a biodegradation process for oily sludge that has not been demonstrated heretofore.

What is claimed is:

1. A method for aerobically treating a low solids water-containing oily sludge which comprises combining said sludge with a biologically inert, non-friable bulking agent having at least about 25 volume percent of a component with a density less than water to form a mixture, passing an oxygen-containing gas through said mixture to separate and remove excess water and form a high solids content reaction mixture, reacting said high solids content reaction mixture in the presence of an aerobic biomass under effective aerobic conditions to form a treated sludge and an active biomass-coated bulking agent component having a density less than water in said high solids content reaction mixture, separating said biomass-coated bulking agent component from said treated sludge, and recovering said treated sludge from said reaction mixture.

2. A method according to claim 1 in which said bulking agent comprises a mixture of bulking agent components in which at least one of said components has a density less than water.

3. A method according to claim 1 in which said bulking agent component having a density less than water comprises from about 25 to 75 volume percent of said bulking agent.

4. A method according to claim 1 in which said high solids content reaction mixture is a wetted reaction mixture.

5. A method according to claim 1 in which said oxygen passes into said biomass in a single mass transfer step.

6. A method according to claim 1 in which said bulking agent component having a density less than water has a dry bulk density ranging from about 0.5 to 15 pounds per cubic foot.

7. A method according to claim 1 in which said bulking agent component has a dry bulk density ranging from about 1 to 10 pounds per cubic foot.

8. A method according to claim in which said low solids content water-containing oily sludge has a solids content in the range from about 1 to 30 weight percent and said high solids content mixture contains from about 40 to 60 volume percent solids.

9. A method according to claim 8 in which said low solids content water-containing oil sludge has a solids content ranging from 1 to 10 weight percent.

10. A method according to claim 1 in which said aerobic reaction conditions include a temperature in the range of 70° F. to 180° F. and a pH in the range of 5.5 to 9.

11. A method according to claim 1 in which said bulking agent has a particle size ranging from about 0.2 to 25 millimeters diameter.

12. A method according to claim 1 in which said bulking agent is in granular form and has a particle size ranging from about 1 to 10 millimeters 13. A method according to claim 1 in which pressure differential means are employed to pass said oxygen-containing gas through said mixture and to enhance removal of excess water.

14. A method according to claim 1 in which said aerobic reaction is conducted in a closed reaction vessel.

15. A method according to claim 1 in which said aerobic react is effected with a bacterium selected from the class consisting of mesophilic bacteria and thermophilic bacteria.

16. A method according to claim 1 in which said high solids content mixture has a depth ranging from about 3 to 20 feet.

17. A method according to claim 1 in which an oxygen-containing offgas is recovered and recycled to said reaction mixture.

18. A method according to claim 1 in which said oxygen-containing gas to said reaction mixture is heated.

19. A method according to claim 1 in which said biomass-coated bulking agent component having a density less than water is separated from said treated sludge by flotation.

20. A method according to claim 1 in which said bulking agent is an organic polymer.

21. A method according to claim I in which said bulking agent polymer is selected from the class consisting of polystyrene and polypropylene.

22. A method according to claim 1 in which said bulking agent is a closed cell foam polymer.

23. A method according to claim 1 in which said oxygen-containing gas is passed downwardly through said reaction mixture.

24. A method according to claim 1 in which a vacuum is employed to separate water from said low solids content reaction mixture and draw an oxygen-containing gas through said reaction mixture.

25. A method according to claim 1 in which said oxygen-containing gas contains from about 10 to 50 volume percent of oxygen.

26. A method according to claim 1 in which said oxygen-containing gas contains from about 14 to 30 volume percent of oxygen.

27. A method according to claim 1 in which biological nutrients other than carbon are added to said reaction mixture.

28. A method according to claim 1 in which said water and said oxygen-containing gas are removed from said reaction mixture through a vapor and liquid permeable separator.

29. A method according to claim 1 in which said high solids content reaction mixture has a density ranging from about 10 to 80 pounds per cubic foot.

30. A method according to claim 1 in which said high solids content reaction mixture has a density ranging from about 20 to 75 pounds per cubic foot.

31. A method according to claim 1 in which said high solids content reaction mixture has a density ranging from about 30 to 60 pounds per cubic foot.

32. A method according to claim 1 in which at least 50 percent of said biomass-coated bulking agent component having a density less than water is separated from said treated sludge.

33. A method according to claim 1 in which at least 65 percent of said biomass-coated bulking agent component having a density less than water is separated from said treated sludge.

34. A method according to claim 1 in which at least 80 percent of said biomass-coated bulking agent component having a density less than water is separated from said treated sludge.

35. A method according to claim 34 in which at least 90 percent of said biomass-coated bulking agent is separated from said treated sludge.

* * * * *